United States Patent
Nagai et al.

(10) Patent No.: US 10,848,039 B2
(45) Date of Patent: Nov. 24, 2020

(54) METHOD OF MANUFACTURING LAMINATED ROTOR CORE

(71) Applicant: Mitsui High-tec, Inc., Kitakyushu (JP)

(72) Inventors: Akira Nagai, Kitakyushu (JP); Kenji Katsuki, Kitakyushu (JP); Go Kato, Kitakyushu (JP)

( * ) Notice: Subject to any disclaimer, the term of this patent is extended or adjusted under 35 U.S.C. 154(b) by 328 days.

(21) Appl. No.: 15/694,967

(22) Filed: Sep. 4, 2017

(65) Prior Publication Data

US 2018/0076700 A1   Mar. 15, 2018

(30) Foreign Application Priority Data

Sep. 9, 2016   (JP) .................................. 2016-176553

(51) Int. Cl.
| | |
|---|---|
| H02K 15/02 | (2006.01) |
| H02K 15/16 | (2006.01) |
| H02K 15/03 | (2006.01) |
| H02K 1/27 | (2006.01) |

(52) U.S. Cl.
CPC ........... *H02K 15/165* (2013.01); *H02K 15/03* (2013.01); *H02K 1/276* (2013.01); *Y10T 29/49012* (2015.01)

(58) Field of Classification Search
CPC .......... H02K 7/04; H02K 15/03; H02K 1/28; H02K 15/02; H02K 15/165; H02K 15/16; H02K 1/27; Y10T 29/49012

USPC ................. 29/598, 596, 604, 607, 609, 732
See application file for complete search history.

(56) References Cited

U.S. PATENT DOCUMENTS

| | | | |
|---|---|---|---|
| 6,799,362 B2 * | 10/2004 | Murakami ............. | H02K 1/276 29/598 |
| 8,324,781 B2 | 12/2012 | Goto et al. | |
| 9,800,125 B2 * | 10/2017 | Ballweg ................. | H02K 19/14 |
| 2016/0013709 A1 | 1/2016 | Nagai et al. | |
| 2016/0211711 A1 | 7/2016 | Yazaki | |

FOREIGN PATENT DOCUMENTS

| | | |
|---|---|---|
| CN | 104659936 | 5/2015 |
| CN | 105281457 | 1/2016 |
| CN | 105811613 | 7/2016 |
| DE | 102013215080 | 2/2015 |
| JP | 2000-321162 | 11/2000 |
| JP | 2002-010588 | 1/2002 |
| JP | 2012-100499 | 5/2012 |
| JP | 2012-125075 | 6/2012 |

* cited by examiner

*Primary Examiner* — Thiem D Phan
(74) *Attorney, Agent, or Firm* — Soei Patent & Law Firm

(57) ABSTRACT

A method of manufacturing a rotor core having a plurality of core members stacked together includes determining weight imbalances for the plurality of core members with respect to a central axis of the rotor core; combining the weight imbalances of the plurality of core members to determine a weight distribution of the rotor core; and displacing the weight imbalances of one or more of the plurality of core members to adjust a position of the weight distribution of the rotor core with respect to the central axis.

16 Claims, 11 Drawing Sheets

Fig.8
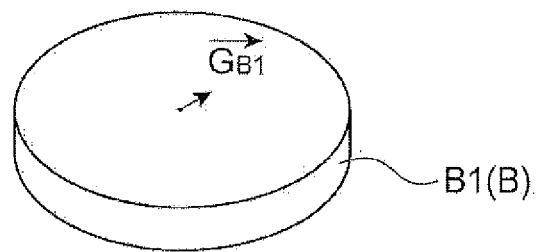
B1(B)
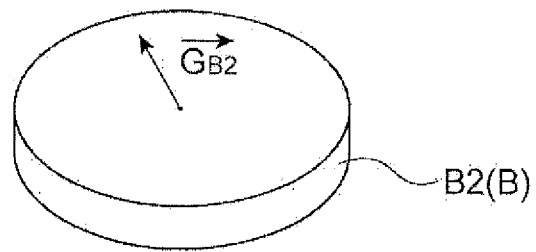
B2(B)
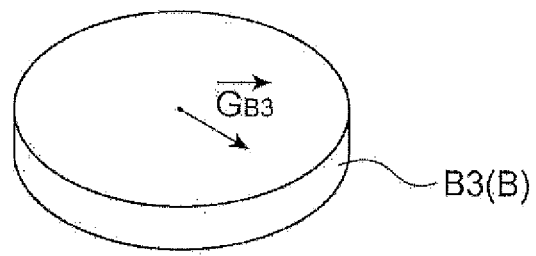
B3(B)
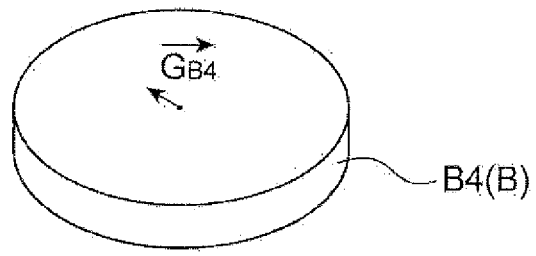
B4(B)
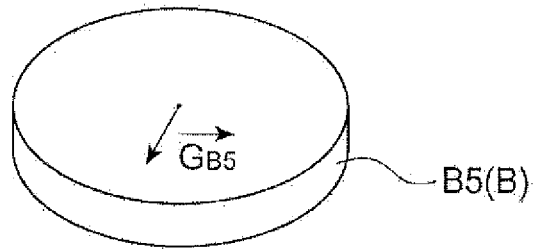
B5(B)
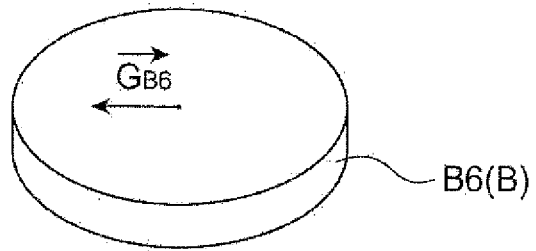
B6(B)

METHOD OF MANUFACTURING LAMINATED ROTOR CORE

CROSS-REFERENCE TO RELATED APPLICATIONS

This application is based upon and claims the benefit of priority from Japanese Patent Application No. 2016-176553, filed Sep. 9, 2016, the entire contents of which are incorporated herein by reference.

BACKGROUND

1. Field

The present disclosure relates to a method of manufacturing a laminated rotor core and an apparatus for manufacturing a laminated rotor core.

2. Disclosure of the Related Art

A laminated rotor core is typically obtained by laminating a plurality of blanked members that has been stamped in a certain shape from a metal sheet (for example, an electromagnetic steel sheet). In general, the thickness of a metal sheet is not completely uniform but slightly fluctuates. Thus, when a laminated rotor core is obtained by stamping the blanked members in a certain shape from a metal sheet and laminating the blanked members one-by-one, bias may be produced in stacking height (height of the laminated rotor core in a lamination direction) of the laminated rotor core. It is known that there is a positive correlation between the bias in stacking height (hereinafter referred to as "stacking height deviation") and bias in weight balance (hereinafter referred to as "weight imbalance") of the laminated rotor core. If the weight imbalance is present in a laminated rotor core, when a motor is made by using the laminated rotor core, the fluctuation may be produced in torque of the motor and the like and that may affect the performance of the motor.

Accordingly, Japanese Unexamined Patent Application Publication No. 2012-100499 discloses a method of manufacturing a laminated rotor core. This manufacturing method includes a step of obtaining a laminate provided with a plurality of cavity holes running through in the lamination direction by stamping blanked members from a metal sheet and laminating the blanked members one-by-one; a step of acquiring the stacking height deviation of the laminate; a step of determining the amount of resin for filling the respective cavity holes based on the acquired stacking height deviation; and a step of integrating the blanked members together by filling and solidifying resin material into the respective cavity holes based on the determined amount of resin. According to this manufacturing method, for example, by increasing the amount of resin to the cavity hole located at a place where, of the laminate, the stacking height deviation is small, it is possible to suppress the weight imbalance.

SUMMARY

The method of manufacturing a laminated rotor core according to one aspect of the present disclosure includes: a first step of measuring weight imbalance of each of a plurality of core members; a second step of determining, based on a measurement result at the first step, a laminating condition of the core members for adjusting the weight imbalance; and a third step of laminating, the core members based on the laminating condition.

The apparatus for manufacturing a laminated rotor core according to another aspect of the present disclosure includes a measuring unit configured to measure weight imbalance of each of a plurality of core members, a laminating unit configured to laminate the core members, and a controller. The controller executes a first process of controlling the measuring unit to cause the measuring unit to measure weight imbalance of each of the core members; a second process of determining, based on a measurement result at the first process, a laminating condition of the core members for adjusting the weight imbalance; and a third process of controlling the laminating unit to cause the laminating unit to laminate, the core members based on the laminating condition.

The method of manufacturing a rotor core having a plurality of core members stacked together according to another aspect of the present disclosure includes: determining weight imbalances for the plurality of core members with respect to a central axis of the rotor core; combining the weight imbalances of the plurality of core members to determine a weight distribution of the rotor core; and displacing the weight imbalances of one or more of the plurality of core members to adjust a position of the weight distribution of the rotor core with respect to the central axis.

The apparatus for manufacturing a rotor core having a plurality of core members stacked together according to another aspect of the present disclosure includes: a measuring instrument configured to determine weight imbalances for each of the plurality of core members with respect to a central axis of the rotor core; a controller configured to combine the weight imbalances of the plurality of core members and to determine a weight distribution of the rotor core; and an assembly device configured to displace the weight imbalances of one or more of the plurality of core members and to adjust a position of the weight distribution of the rotor core with respect to the central axis.

The apparatus for manufacturing a rotor core having a plurality of core members stacked together according to another aspect of the present disclosure includes means for determining weight imbalances for each of the plurality of core members with respect to a central axis of the rotor core; means for combining the weight imbalances of the plurality of core members in order to determine a weight distribution of the rotor core; and means for displacing the weight imbalances of one or more of the plurality of core members in order to adjust a position of the weight distribution of the rotor core with respect to the central axis.

The detailed description given herein below and the accompanying drawings are given by way of illustration only.

BRIEF DESCRIPTION OF THE DRAWINGS

FIG. 8 is a diagram for explaining a method of determining a laminating condition;

DETAILED DESCRIPTION

Figure 1:
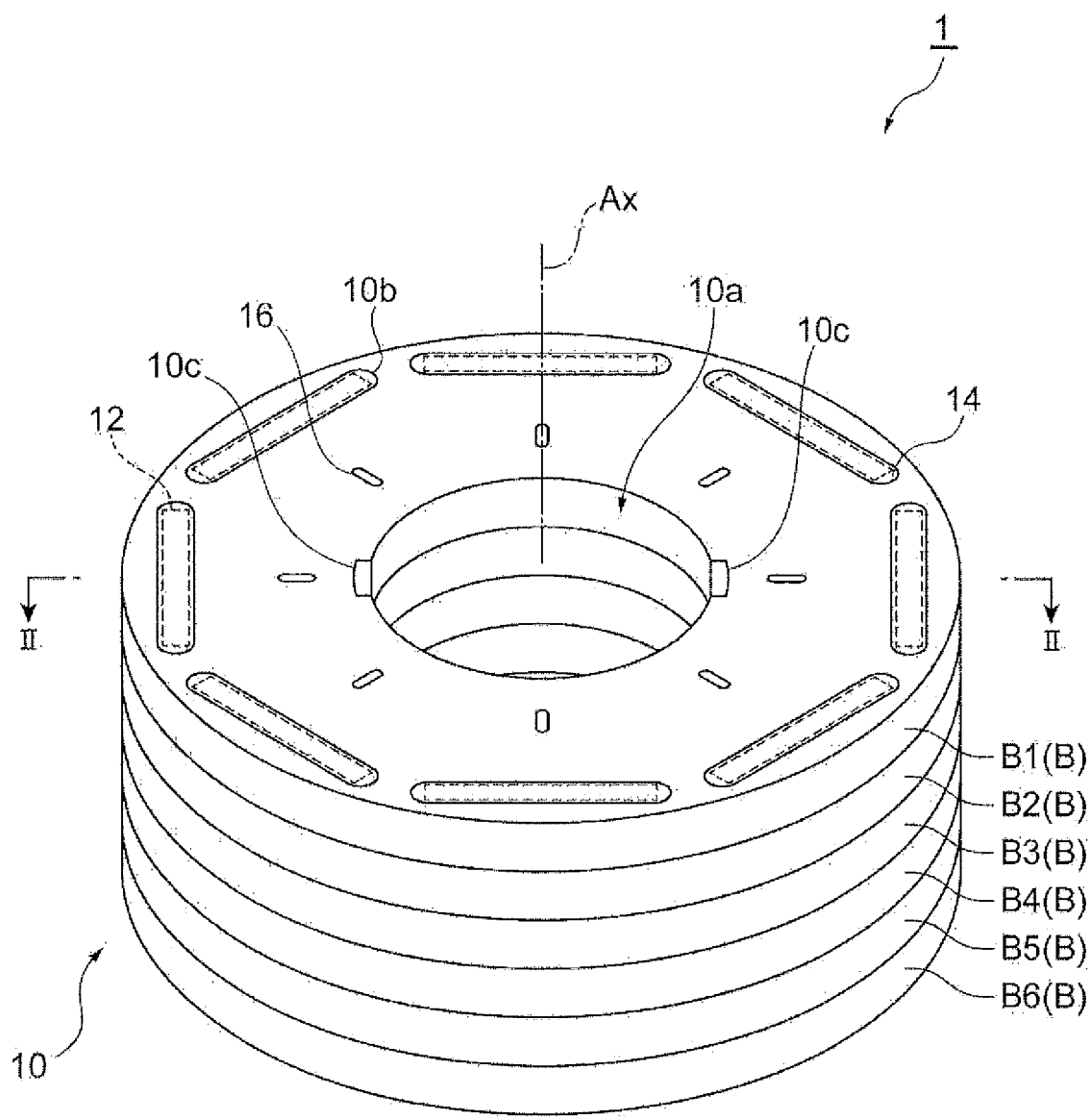
FIG. 1 is a perspective view illustrating one example of a laminated rotor core.

Exemplary embodiments described in the following according to the present disclosure are examples for explaining the present invention, and thus the invention should not be limited to the following details.

Overview (1) A method of manufacturing a laminated rotor core according to one example includes a first step of measuring weight imbalance of each of a plurality of core members; a second step of determining, based on a measurement result at the first step, a laminating condition of the core members for adjusting the weight imbalance; and a third step of laminating, the core members based on the laminating condition.

In the method of manufacturing a laminated rotor core, at the second step, the laminating condition of each core member is determined based on the measurement result of the weight imbalance of the each core member. The weight imbalance means bias in weight balance of a core member, and specifically means a weight distribution of the core member around a central axis thereof, or the amount of displacement in the position of the center of gravity of a laminated core from the central axis. At the second step, by determining the laminating condition such that the weight imbalance becomes the smallest when laminating each of the core members, it becomes possible to suppress the weight imbalance of a laminate obtained by laminating the respective core members. Moreover, in contrast with the method in Japanese Unexamined Patent Application Publication 2012400499 that adjusts the weight imbalance after the completion of a laminate by injecting resin material into the cavity holes of the laminate, the method of manufacturing a laminated rotor core adjusts the weight imbalance at the time of forming a laminate by laminating each core member based on a certain laminating condition without depending on the other members such as resin material. Thus, the thickness in the lamination direction of the laminate inevitably comes close to being uniform. Accordingly, it becomes possible to obtain a laminated rotor core excellent in flatness.

(2) In the method described in the above-described item (1), at the second step, the necessity of rotational lamination may be determined on each of the core members, as the laminating condition.

(3) In the method described in the above-described item (1) or (2), at the second step, the necessity of inversion may be determined on each of the core members, as the laminating condition.

(4) The method described in any one of the above-described items (1) to (3) may further include: a fourth step of determining, based on a measurement result at the first step, at least any one of conditions: (A) a location of a permanent magnet to be inserted into a through hole that is provided in a laminate in which the plurality of core members are laminated, the through hole extending in a lamination direction of the laminate, (B) weight of a permanent magnet to be inserted into the through hole, and (C) an amount of resin material filled into the through hole, as an additional condition to additionally adjust the weight imbalance; and a fifth step of inserting a permanent magnet into the through hole or filling resin material into the through hole, based on the additional condition, after the third step and the fourth step. In this case, the weight imbalance of the laminate after completion is further adjusted based on at least any one of the additional conditions A to C. Thus, not only in forming a laminate but also after the completion of the laminate, it is possible to minutely adjust the weight imbalance of the laminate. Accordingly, it becomes possible to further suppress the weight imbalance of the laminate.

(5) In the method described in any one of the above-described items (1) to (4), each of the core members may be a block body in which a plurality of blanked members stamped from a metal sheet are laminated, and at the first step, the stacking height of the respective core members may be measured. A measurement instrument that directly measures the weight imbalance is generally expensive, and thus, by assuming the stacking height a subject of measurement, it becomes possible to perform the measurement at low cost. Because the blanked member is generally very thin, to measure the stacking height of the blanked member, an expensive measurement instrument can be needed after all, and the measurement work can be cumbersome. However, the block body in which a plurality of blanked members are laminated has a relatively large volume and is easy to handle, and thus it becomes possible to measure the stacking height of the block body simply and at low cost.

(6) An apparatus for manufacturing a laminated rotor core according to another example includes: a measuring unit configured to measure weight imbalance of each of a plurality of core members; a laminating unit configured to laminate the core members; and a controller. The controller executes: a first process of controlling the measuring unit to cause the measuring unit to measure weight imbalance of each of the core members; a second process of determining, based on a measurement result at the first process, a laminating condition of the core members for adjusting the weight imbalance; and a third process of controlling the laminating unit to cause the laminating unit to laminate, the core members based on the laminating condition. The apparatus may have the same operation and effect as those of the method that is described in the above-described item (1).

(7) In the apparatus described in the above-described item (6), the controller may determine, at the second process, the necessity of rotational lamination on each of the core members, as the laminating condition.

(8) In the apparatus described in the above-described item (6) or (7), the controller may determine, at the second process, the necessity of inversion on each of the core members.

(9) The apparatus described in any one of the above-described items (6) to (8) may further include an operation unit configured to perform work of inserting a permanent magnet or work of filling resin material into a through hole that is provided in a laminate in which the plurality of core members are laminated, the through hole extending in a lamination direction of the laminate, and the controller may perform a fourth process of determining, based on a measurement result at the first process, at least any one of conditions: (A) a location of a permanent magnet to be inserted into the through hole, (B) weight of a permanent magnet to be inserted into the through hole, and (C) an amount of resin material filled into the through hole, as an additional condition to additionally adjust the weight imbalance; and a fifth process of controlling, based on the additional condition, the operation unit to cause the operation unit to insert a permanent magnet into the through hole or fill resin material into the through hole, after the third process and the fourth process. In this case, the operation and effect may be the same as those of the method described in the above-described item (4).

(10) In the apparatus described in any one of the above-described items (6) to (9), each of the core members may be a block body in which a plurality of blanked members stamped from a metal sheet are laminated, and the controller may, at the first process, control the measuring unit so as to measure the stacking height of the respective core members. In this case, the operation and effect may be the same as those of the method described in the above-described item (5).

(11) A method of manufacturing a rotor core having a plurality of core members stacked together according to another example includes: determining weight imbalances for the plurality of core members with respect to a central axis of the rotor core; combining the weight imbalances of the plurality of core members to determine a weight distribution of the rotor core; and displacing the weight imbalances of one or more of the plurality of core members to adjust a position of the weight distribution of the rotor core with respect to the central axis. The method may have the same operation and effect as those of the method that is described in the above-described item (1).

(12) In the method described in the above-described item (11), determining the weight imbalances may include measuring a center of gravity of each core member with respect to the central axis of the rotor core.

(13) In the method described in the above-described item (11) or (12), determining the weight imbalances may include measuring each core member at a plurality of locations around the central axis for uniformity in thickness.

(14) In the method described in any one of the above-described items (11) to (13), the position of the weight distribution of the rotor core may be adjusted by rotating one or more of the core members relative to other core members.

(15) In the method described in the above-described item (14), a first weight imbalance may be associated with a first core member and a second weight imbalance may be associated with a second core member, and displacing the weight imbalances may include offsetting the first weight imbalance with the second weight imbalance when the second core member is rotated relative to the first core member.

(16) In the method described in any one of the above-described items (11) to (15), displacing the weight imbalances may include rotationally laminating the core members.

(17) In the method described in the above-described item (16), rotationally laminating the core members may include angularly displacing one or more of the core members relative to each other; and laminating the core members while the one or more core members are being angularly displaced.

(18) In the method described in any one of the above-described items (11) to (17), displacing the weight imbalances may include vertically inverting one or more of the core members in the rotor core.

(19) In the method described in the above-described item (18), a core member may include an upper surface facing an upper core member and a lower surface facing a lower core member, and inverting the one or more core members may include inverting the core member so that the lower surface faces the upper core member and the upper surface faces the lower core member.

(20) In the method described in any one of the above-described items (11) to (19), displacing the weight imbalances may include inserting one or more magnets into at least one core member. In this case, the operation and effect may be the same as those of the method described in the above-described item (4).

(21) In the method described in the above-described item (20) to (20), the one or more magnets may be inserted into at least one through hole that penetrates through the plurality of core members, and displacing the weight imbalances may further include filling resin material into the at least one through hole. In this case, the operation and effect may be the same as those of the method described in the above-described item (4).

(22) An apparatus for manufacturing a rotor core having a plurality of core members stacked together according to another example includes: a measuring instrument configured to determine weight imbalances for each of the plurality of core members with respect to a central axis of the rotor core; a controller configured to combine the weight imbalances of the plurality of core members and to determine a weight distribution of the rotor core; and an assembly device configured to displace the weight imbalances of one or more of the plurality of core members and to adjust a position of the weight distribution of the rotor core with respect to the central axis. The apparatus may have the same operation and effect as those of the method that is described in the above-described item (1).

(23) In the apparatus described in the above-described item (22), the measuring instrument may be configured to determine the weight imbalances by measuring a center of gravity of each core member with respect to the central axis of the rotor core.

(24) In the apparatus described in the above-described item (22) or (23), the measuring instrument may be configured to determine the weight imbalances by measuring a plurality of locations of each core member for uniformity in thickness.

(25) In the apparatus described in any one of the above-described items (22) to (24), the assembly device may be configured to displace the weight imbalances by rotationally stacking the core members.

(26) In the apparatus described in the above-described item (25), the rotationally stacked core members may include alternating layers of rotated core members and non-rotated core members interleaved together to form the rotor core.

(27) In the apparatus described in any one of the above-described items (22) to (26), the assembly device may be configured to displace the weight imbalances by vertically inverting one or more of the core members in the rotor core.

(28) An apparatus for manufacturing a rotor core having a plurality of core members stacked together according to another example includes means for determining weight imbalances for the plurality of core members; means for combining the weight imbalances of the plurality of core members in order to determine a weight distribution of the rotor core with respect to a central axis of the rotor core; and means for displacing the weight imbalances of one or more of the plurality of core members in order to adjust a position of the weight distribution of the rotor core with respect to the central axis. The apparatus may have the same operation and effect as those of the method that is described in the above-described item (1).

(29) In the apparatus described in the above-described item (28), the means for displacing comprises means for angularly displacing one or more of the core members relative to each other.

(30) In the apparatus described in the above-described item (28) or (29), the means for displacing comprises means for inverting one or more of the core members.

In the following description, and referring to the accompanying drawings, identical constituent elements or the constituent elements having the identical function will be given identical reference signs and redundant explanations are omitted.

Configuration of Laminated Rotor Core

First, with reference to FIGS. 1 to 3, the configuration of a laminated rotor core 1 will be described. The laminated rotor core 1 is a part of a rotor 2 (see FIG. 10, details will be described later). By combining the rotor with a stator, an electric motor (motor) is composed. The laminated rotor core 1 includes, as illustrated in FIG. 1, a laminate 10, a plurality of permanent magnets 12, and a plurality of pieces of resin material 14.

In the laminate 10, a plurality of block bodies B (core members) are laminated in this order. In the example illustrated in FIGS. 1 to 3, the laminate 10 has six block bodies B1 to B6 laminated toward the lower side from the upper side in this order.

Figure 2:
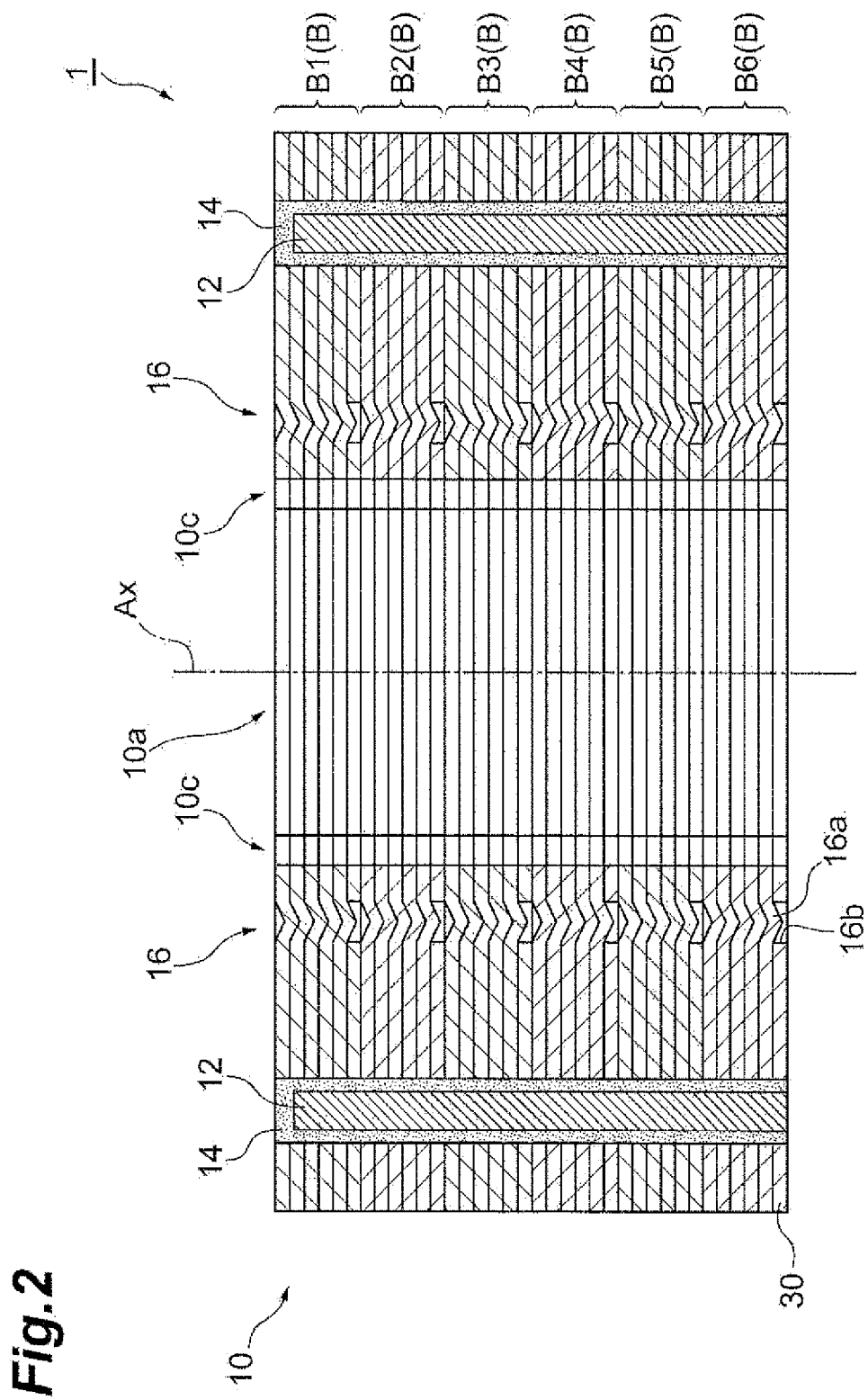
FIG. 2 is a cross-sectional view at the line II-II in FIG. 1.
Figure 3:
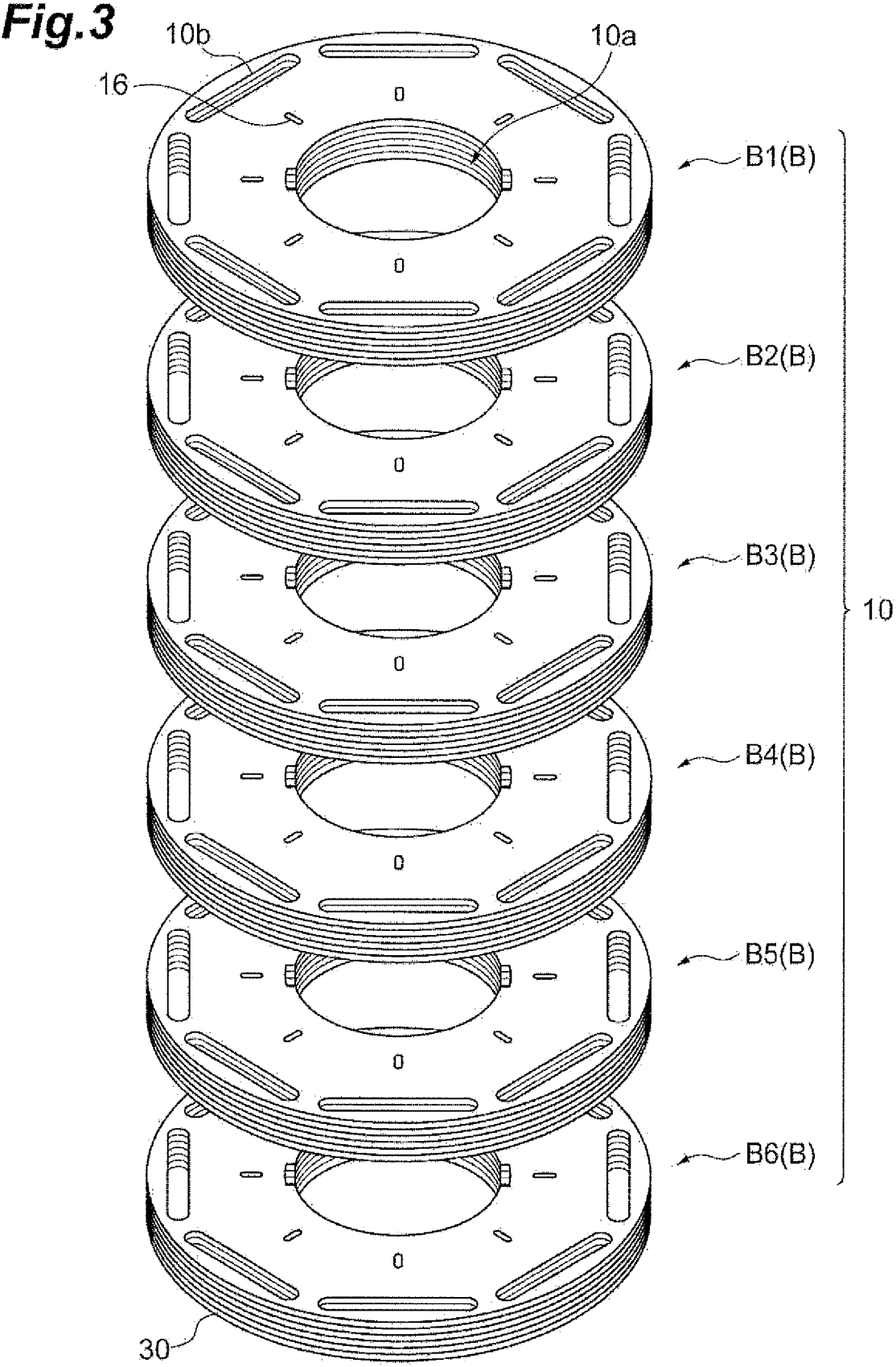
FIG. 3 is an exploded perspective view of a laminate.

The block body B is, as illustrated in FIGS. 2 and 3, a laminate in which a plurality of blanked members 30 are stacked. The blanked members 30 adjacent in the lamination direction of laminating the block bodies B (hereinafter simply referred to as "lamination direction") are fastened by interlocking parts 16. The block bodies B adjacent in the lamination direction are not fastened by the interlocking parts 16. Specifically, as illustrated in FIG. 2, the interlocking part 16 includes swaged areas 16a formed on the blanked members 30 constituting the block body B except for a bottom layer, and includes a through hole 16b formed on the blanked member 30 constituting the bottom layer of the block body B. The swaged area 16a is constituted by a depression formed on the front surface side of the blanked member 30, and by a projecting portion formed on the back surface side of the blanked member 30. The depression of the swaged area 16a of one blanked member 30 is joined with the projecting portion of the swaged area 16a of another blanked member 30 adjacent on the front surface side of the one blanked member 30. The projecting portion of the swaged area 16a of one blanked member 30 is joined with the depression of the swaged area 16a of another blanked member 30 adjacent on the back surface side of the one blanked member 30. The projecting portion of the swaged area 16a of the blanked member 30 adjacent to the bottom layer of the laminated rotor core 1 is joined with the through hole 16b. The through hole 16b has a function of, in manufacturing the block bodies B consecutively, preventing a subsequently manufactured block body B from being fastened to the block body B that has already been manufactured by the swaged area 16a.

The laminate 10, as illustrated in FIG. 1, is in a cylindrical shape. In the central portion of the laminate 10, as illustrated in FIGS. 1 and 2, a shaft hole 10a that runs through the laminate 10 so as to extend along the central axis Ax is provided. The shaft hole 10a extends in the lamination direction. The lamination direction is also the extending direction of the central axis Ax. A shaft 20 (see FIG. 10, details will be described later) is inserted through the shaft hole 10a.

A plurality of magnet insertion holes 10b (through holes) and a plurality of depressions 10c are formed on the laminate 10. The magnet insertion holes 10b, as illustrated in FIGS. 1 and 3, are in line along the outer circumferential edge of the laminate 10 at certain intervals. The magnet insertion holes 10b, as illustrated in FIG. 2, extend along the central axis Ax (lamination direction) and run through the laminate 10.

The shape of the magnet insertion hole 10b is a long hole extending along the outer circumferential edge of the laminate 10. The number of the magnet insertion holes 10b is eight. The locations, the shape, and the number of the magnet insertion holes 10b may be altered in other examples depending on the purpose, requested performance, and other aspects of the motor.

The depressions 10c are disposed in the shaft hole 10a. The depression 10c, as illustrated in FIGS. 1 to 3, is sunken outwardly from the inner circumferential surface of the shaft hole 10a in the radial direction. A pair of the depressions 10c face each other with respect to the central axis Ax. That is, the two depressions 10c are disposed every 180° with respect to the central axis Ax in the shaft hole 10a. The depression 10c functions as a key groove into which a key member that couples the laminated rotor core 1 with the shaft 20 is inserted, for example. The shape and the number of the depressions 10c may be altered depending on the purpose, requested performance, and other aspects of the motor.

The permanent magnets 12, as illustrated in FIGS. 1 and 2, are inserted into the magnet insertion holes 10b. The number of the permanent magnets 12 inserted into the magnet insertion hole 10b may be one, two or more. When a plurality of permanent magnets 12 are inserted into the magnet insertion hole 10b, the permanent magnets 12 may be, in the magnet insertion hole 10b, juxtaposed in the lamination direction, juxtaposed in the circumferential direction of the laminate 10, or juxtaposed in the radial direction thereof. The type of the permanent magnets 12 only needs to be determined depending on the purpose, requested performance, and other aspects of the motor, and for example, the permanent magnets 12 may be sintered magnets or may be bonded magnets.

The resin material 14 is filled into the magnet insertion hole 10b after having inserted the permanent magnet 12. The resin material 14 has a function of fixing the permanent magnet 12 in the magnet insertion hole 10b, a function of coupling the adjacent blanked members 30 in the up/down direction, and a function of coupling the adjacent block bodies B in the up/down direction. Examples of the resin material 14 include a thermosetting resin. Specific examples of the thermosetting resin include a resin composition that contains epoxy resin, a curing initiator, and additives. Examples of the additives include filler, flame retardants, and stress reducing agents. As the resin material 14, a thermoplastic resin may be used.

Apparatus for Manufacturing Laminated Rotor Core

Figure 4:
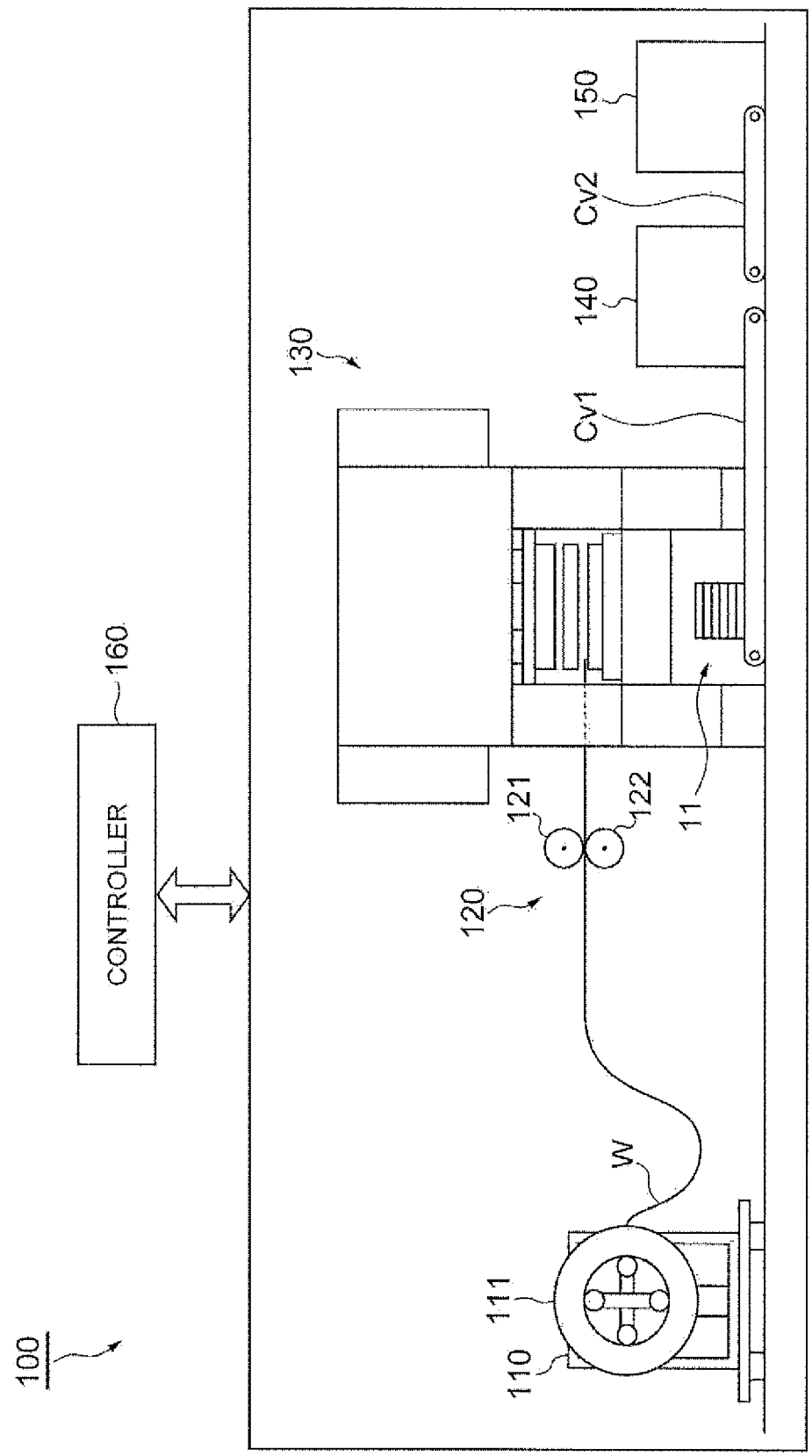
FIG. 4 is a schematic diagram illustrating one example of an apparatus for manufacturing a laminated rotor core.
Figure 5:
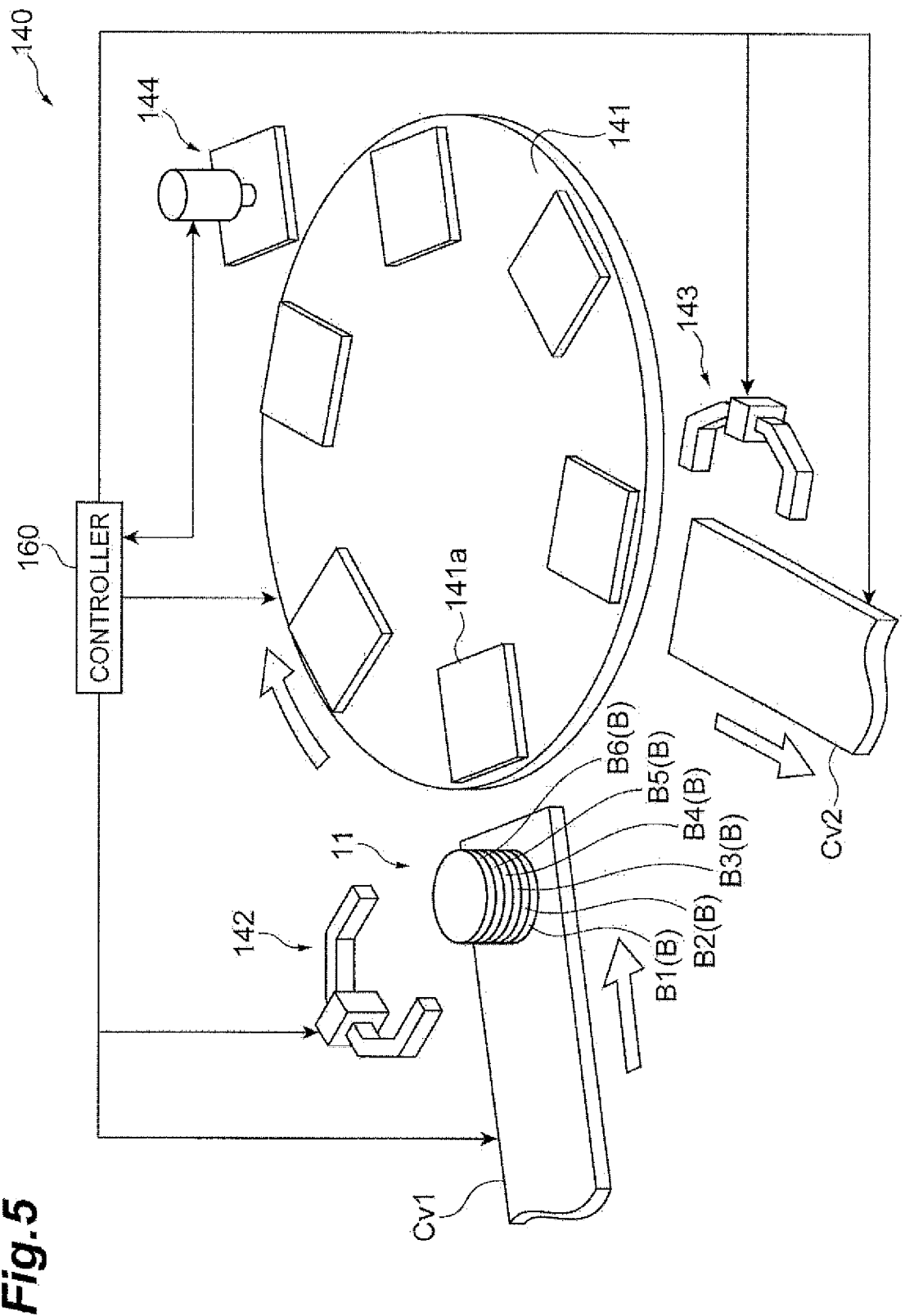
FIG. 5 is a schematic perspective view illustrating one example of a laminating device.

Next, with reference to FIGS. 4 and 5, an apparatus 100 for manufacturing the laminated rotor core 1 will be described. In FIG. 5, the block body B is illustrated in a simplified manner.

The manufacturing apparatus 100 is an apparatus for manufacturing the laminated rotor core 1 from an electromagnetic steel sheet W (workpiece plate) that is a belt-like metal sheet. The manufacturing apparatus 100, as illustrated in FIG. 4, includes an uncoiler 110, a let-off device 120, a blanking device 130, a laminating device 140, a magnet mounting device 150 (operation unit), and a controller 160 (controller).

The uncoiler 110 rotatively holds a coil material 111 attached thereto, the coil material 111 being the belt-like electromagnetic steel sheet W wound in a coil shape. The let-off device 120 includes a pair of rollers 121 and 122 that sandwiches the electromagnetic steel sheet W from above and below. The pair of rollers 121 and 122 rotates and stops based on an instruction signal from the controller 160, and intermittently sends off the electromagnetic steel sheet W toward the blanking device 130 in sequence.

The length of the electromagnetic steel sheet W constituting the coil material 111 may be about 500 to 10000 m, for example. The thickness of the electromagnetic steel sheet W may be about 0.1 to 0.5 mm, for example. The thickness of the electromagnetic steel sheet W may, in terms of obtaining the laminated rotor core 1 having better magnetic characteristics, be about 0.1 to 0.3 mm, for example. The width of the electromagnetic steel sheet W may be about 50 to 500 min, for example.

The blanking device 130 operates based on an instruction signal from the controller 160. The blanking device 130 has a function of forming the blanked members 30 by blanking the electromagnetic steel sheet W that is intermittently sent off by the let-off device 120 in sequence, a function of manufacturing a plurality of block bodies B by overlapping the blanked members 30 that are obtained by blanking in sequence while laminating, and a function of composing a tentative laminate 11 by temporarily stacking the block bodies B. The tentative laminate 11, when discharged from the blanking device 130, is placed on a conveyor Cv1 that is provided extending between the blanking device 130 and the laminating device 140. The conveyor Cv1 operates based on instructions from the controller 160, and sends off the tentative laminate 11 to the laminating device 140.

The laminating device 140 has a function of, based on a certain laminating condition, laminating the block bodies B that are manufactured by the blanking device 130. The laminating device 140, as illustrated in FIG. 5, includes a rotary table 141, transfer arms 142 and 143, and a stacking-height measurement instrument 144 (measuring unit).

The rotary table 141 is in a circular shape and is configured to be rotatable around the central axis based on an instruction signal from the controller 160. On the principal surface of the rotary table 141, a plurality of pedestals (six pedestals in FIG. 5) 141a are provided. Each of the pedestals 141a is in line at substantially equal intervals along the outer circumference of the rotary table 141. A single block body B is placed on each pedestal 141a.

The transfer arms 142 and 143 each operate based on an instruction signal from the controller 160. The transfer arms 142 and 143 are each configured to be capable of grasping and transferring a single block body B. Specifically, the transfer arm 142 has a function of grasping a single block body B out of the tentative laminate 11 conveyed by the conveyor Cv1, and transferring the block body B on a single pedestal 141a of the rotary table 141. The transfer arm 143 (laminating unit) has a function of grasping a single block body B placed on a single pedestal 141a of the rotary table 141, and transferring it on a conveyor Cv2 on the downstream side of the laminating device 140. The conveyor Cv2 operates based on instructions from the controller 160, and sends off the tentative laminate 11 to the magnet mounting device 150.

The stacking-height measurement instrument 144 operates based on an instruction signal from the controller 160. The stacking-height measurement instrument 144 is located above an area (area where the pedestal 141a is located) on the outer circumferential edge side of the rotary table 141. The stacking-height measurement instrument 144 has a function of measuring the stacking height (height of the block body B in the lamination direction) of each of the block bodies B. The stacking-height measurement instrument 144 measures the stacking height of the block body B in a state of exerting a certain load to the block body B from the lamination direction. While the load exerted to the block body B can be of a variety of magnitude depending on the size of the block body B, it may be the magnitude satisfying that the thickness T of the block body B after having exerted the pressure is equal to or higher than 99.9% of the thickness $T_0$ of the block body B before exerting the pressure but is below the thickness $T_0$ ($0.999\ T_0 \leq T < T_0$), for example. The data of the stacking height of the block body B measured by the stacking-height measurement instrument 144 is transmitted to the controller 160.

Referring back to FIG. 4, the magnet mounting device 150 operates based on an instruction signal from the controller 160. The magnet mounting device 150 has a function of carrying out the work of inserting at least one permanent magnet 12 into the respective magnet insertion holes 10b, and a function of carrying out the work of filling the resin material 14 into the respective magnet insertion holes 10b in which the permanent magnet 12 has been inserted.

The controller 160 generates, based on a program recorded in a recording medium (not depicted) or operation inputs from an operator, the respective instruction signals that cause the let-off device 120, the blanking device 130, the laminating device 140, and the magnet mounting device 150 to operate, and sends the respective instruction signals to the let-off device 120, the blanking device 130, the laminating device 140, and the magnet mounting device 150. The controller 160 receives the data of the stacking height of the block body B measured in the stacking-height measurement instrument 144, and, calculates the weight imbalance of the block body B based on the data. The weight imbalance of the block body B means bias in weight balance of the block body B, and specifically means a weight distribution of the block body B around the central axis Ax, or the amount of displacement in the position of the center of gravity of the block body B from the central axis Ax.

Method of Manufacturing Laminated Rotor Core

Figure 9:
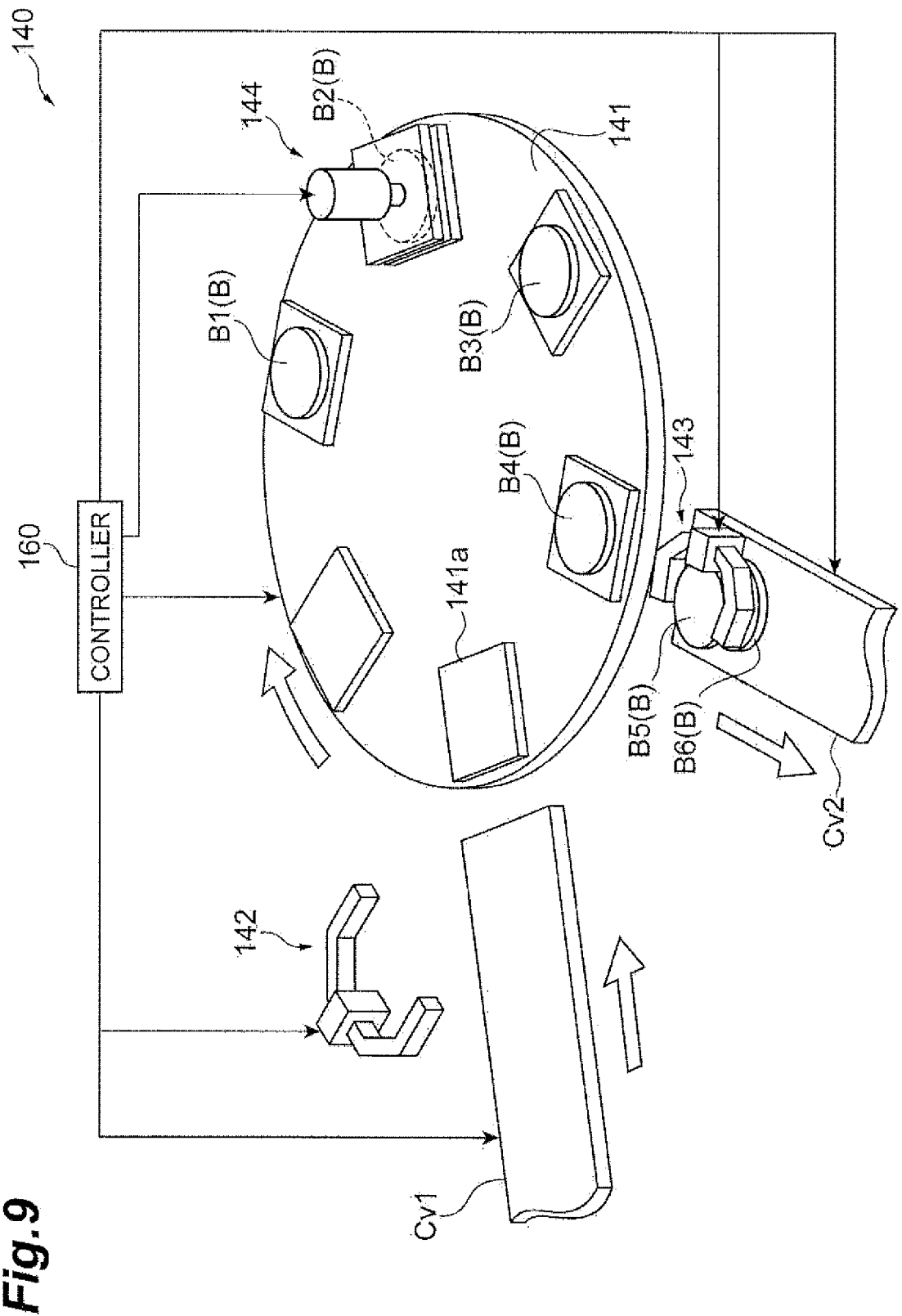
FIG. 9 is a diagram for explaining a lamination process of block bodies.

Next, with reference to FIGS. 5 to 10, the method of manufacturing the laminated rotor core 1 will be described. In FIGS. 7 to 9, the block body B is illustrated in a simplified manner.

Figure 6:
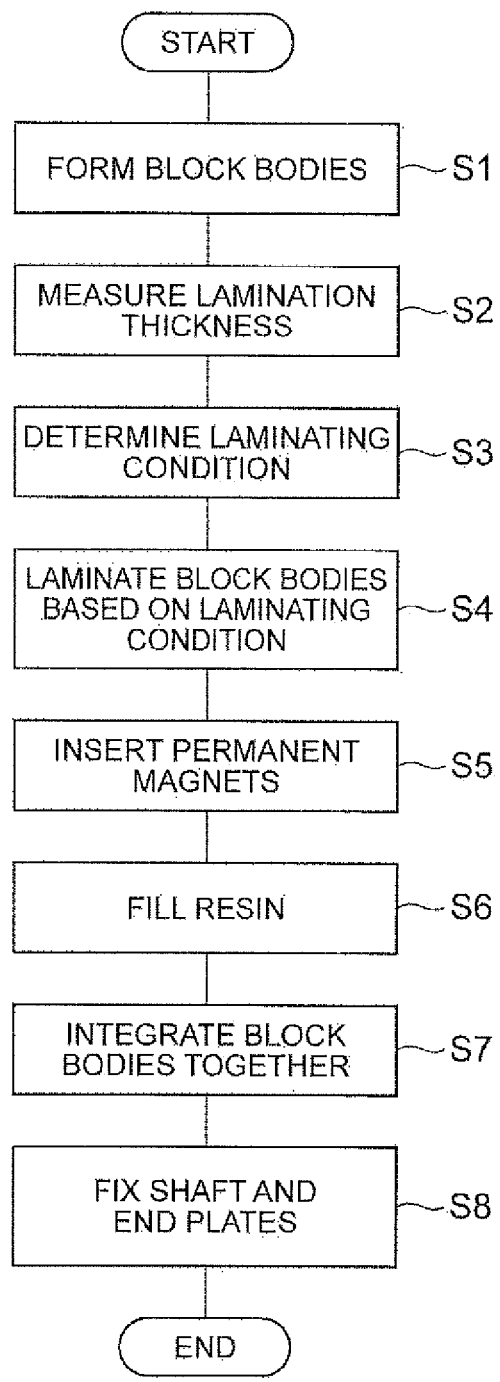
FIG. 6 is a flowchart for explaining one example of a method of manufacturing a laminated rotor core.
Figure 7:
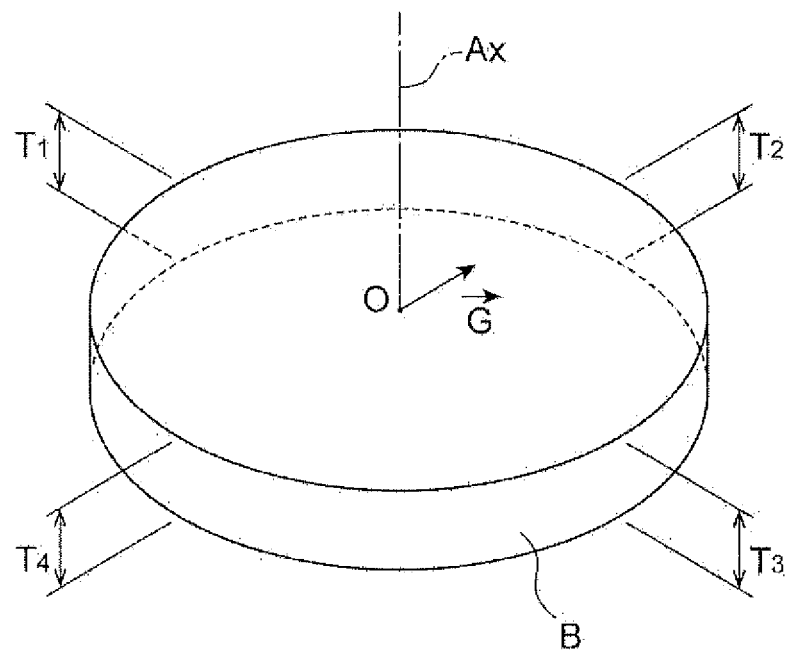
FIG. 7 is a diagram for explaining a method of measuring a stacking height.

First, the block bodies B1 to B6 are formed (see Step S1 in FIG. 6). Specifically, the electromagnetic steel sheet W is sent to the blanking device 130 by the let-off device 120 based on the instructions of the controller 160, and a portion to be worked on the electromagnetic steel sheet W is stamped in a certain shape by the blanking device 130. This forms the blanked member 30. By repeating this stamping, a certain number of the blanked members 30 are laminated while a plurality of blanked members 30 are fastened to each other by the interlocking parts 16, and a single block body B is manufactured. Thereafter, the blanking device 130 further stacks a plurality of blanked members 30 on the block body B, and laminates another block body B on top of the block body B. The blanking device 130, by this repeating, laminates a plurality of block bodies B1 to B6 and forms the tentative laminate 11 in which the block bodies B1 to B6 are laminated in this order toward the top from the bottom (see FIG. 5). At this time, the block bodies B1 to B6 constituting the tentative laminate 11 are not fastened to each other, and are in a state where moving and removing can be freely carried out.

Subsequently, the conveyor Cv1 conveys the tentative laminate 11 formed in the blanking device 130 to the laminating device 140 based on the instructions of the controller 160. When the tentative laminate 11 reaches the laminating device 140, the controller 160 gives instructions to the transfer arm 142 and the rotary table 141. Accordingly, while the rotary table 141 rotates intermittently, the transfer arm 142 grasps the topmost located block body B of the tentative laminate 11 in sequence, and places the block bodies B one-by-one on the vacant pedestal 141a. That is, the transfer arm 142 places, the respective block bodies B on the rotary table 141 (vacant pedestals 141a) in order of the block bodies B6 to B1.

The block body B on the pedestal 141a passes below the stacking-height measurement instrument 144 while the block body B placed on the pedestal 141a rotates around the central axis of the rotary table 141 along with the rotation of the rotary table 141. When the block body B is located below the stacking-height measurement instrument 144, as illustrated in FIG. 9, the stacking-height measurement instrument 144 measures the stacking height of the block body B based on the instructions of the controller 160 (first step, first process, see Step 52 in FIG. 6). Accordingly the stacking height is measured in order of the block bodies B6 to B1 in the stacking-height measurement instrument 144. The stacking-height measurement instrument 144, as illustrated in FIG. 7, measures the stacking height at four places in the outer circumferential edge portion of the block body B, for example. The relevant measurement places are, in FIG. 7, set every 90° around the central axis Ax of the block body B. Thus, the stacking heights $T_1$ to $T_4$ at four places of the block body B are obtained. The number of measurement places is not limited to four places and may be two places or more. The measurement positions may be at equal intervals around the central axis Ax or may be at any desired intervals.

Incidentally, because any of the blanked members 30 are stamped from the same die, the size of any of the blanked members 30 is substantially the same. The density of the electromagnetic steel sheet W from which the blanked member 30 is stamped is also substantially the same with any of the blanked members 30. Thus, the thickness of each of the stacking heights $T_1$ to $T_4$ has the positive correlation with the weight at the respective measurement places. Accordingly, by measuring the respective stacking heights $T_1$ to $T_4$, the weight imbalance of the block body B is obtained. Specifically, when it is assumed that the intersection of the central axis Ax of the block body B and the principal surface of the block body B is the point of origin O, and that the respective stacking heights $T_1$ to $T_4$ are vectors $<T_1>$ to $<T_4>$ extending from the point of origin O toward the respective measurement points, the weight imbalance $<G>$ of the block body B can be expressed in the following Expression 1. In the present description, the symbols "<" and ">" mean that the value enclosed by these is a vector quantity.

$$<G>=<T_1>+<T_2>+<T_3>+<T_4> \quad \text{Expression 1}$$

Upon receiving the data of stacking height of each of the block bodies B1 to B6 from the stacking-height measurement instrument 144, the controller 160 calculates the weight imbalance $<G_{B1}>$ to $<G_{B6}>$ of the respective block bodies B1 to B6 based on Expression 1 as illustrated in FIG. 8. Then, the controller 160 determines whether to rotationally laminate the respective block bodies B1 to B6. The "rotational lamination" refers to displacing the angles of the block bodies B1 to B6 relatively in or prior to laminating the block bodies B1 to B6, and includes laminating the block bodies B1 to B6 while rotating. The rotational lamination is carried out for the purpose of mainly offsetting the deviation in plate thickness of the blanked member 30. In some examples, because the pair of depressions 10c facing each other with respect to the central axis Ax is provided on each of the block bodies B1 to B6, the angle of rotational lamination is set to 180°. However, the angle of rotational lamination may be set to any desired angle depending on the shape of the block body B. While the rotational lamination process is carried out outside the blanking device 130 (what is called out-of-die rotational lamination), it may be carried out in the inside of the blanking device 130.

Specifically, the controller 160 determines whether to rotationally laminate the respective block bodies 131 to 136 in the following manner. In examples in which the angle of rotational lamination is set to 180°, in the posture of the block body B, there are two ways of a case of "rotational lamination unintended" and a case of "rotational lamination intended". In the case of "rotational lamination unintended", the weight imbalance $<G>$ of the block body 13 is added and, in the case of "rotational lamination intended", the weight imbalance $<G>$ of the block body B is subtracted. For example, when all of the block bodies 131 to 136 are "rotational lamination unintended", the weight imbalance $<G_{ALL}>$ of the laminate 10 in which the block bodies B1 to B6 are laminated is expressed by Expression 2.

$$<G_{ALL}>=+<G_{B1}>+<G_{B2}>+<G_{B3}>+<G_{B4}>+<G_{B5}>+<G_{B6}> \quad \text{Expression 2}$$

For example, when the block bodies B1, B3, and B5 are "rotational lamination unintended" and the block bodies B2, B4, and B6 are "rotational lamination intended", the weight imbalance $<G_{ALL}>$ of the laminate 10 in which the block bodies B1 to B6 are laminated is expressed by Expression 3.

$$<G_{ALL}>=+<G_{B1}>-<G_{B2}>-+<G_{B3}>-<G_{B4}>+<G_{B5}>-<G_{B6}> \quad \text{Expression 3}$$

When all aspects of the necessity of rotational lamination on the block bodies B1 to B6 are considered, the number of combinations of the laminate 10 obtained by laminating the block bodies B1 to B6 is 64 ($=2^6$). That is, the controller 160 calculates the weight imbalance $<G_{ALL}>$ in 64 ways and, as a laminating condition, determines whether to rotationally laminate the respective block bodies B1 to B6 in the laminate 10 for which the magnitude $|<G_{ALL}>|$ of the weight imbalance $<G_{ALL}>$ in those 64 ways is the smallest (second step, second process, Step S3). In other words, the controller 160 obtains virtual laminates 10 on all the combinations concerning the necessity of rotational lamination, and then determines the one that is the smallest of the magnitude $|<G_{ALL}>|$ out of the virtual laminates 10. A vector quantity enclosed by the symbol "1" indicates the absolute value (scalar) of the vector quantity.

When the laminating condition is thus obtained, as illustrated in FIG. 9, the controller 160 gives instructions to the transfer arm 143, and laminates the block bodies B1 to B6 while changing the posture thereof based on the laminating condition (third step, third process, see Step S4 in FIG. 6). For example, when the laminating condition is as follows, the transfer arm 143 operates in the following manner based on the instructions from the controller 160.

Laminating Condition
Block body B1: Rotational lamination unintended
Block body B2: Rotational lamination intended
Block body B3: Rotational lamination unintended
Block body B4: Rotational lamination intended
Block body B5: Rotational lamination unintended
Block body B6: Rotational lamination intended That is, the transfer arm 143 grasps the block body B6 on the pedestal 141a, rotates it 180°, and then places on the conveyor Cv2 the block body B6 whose posture has been changed. Next, the transfer arm 143 grasps the block body B5 on the pedestal 141a, and places the block body B5 so as to overlap the block body B6 on the conveyor Cv2 without changing the posture of the block body B5. Next, the transfer arm 143 then grasps the block body B4 on the pedestal 141a, rotates it 180°, and then places the block body B4 whose posture has been changed so as to overlap the block body B5 on the conveyor Cv2. Next, the transfer arm 143 grasps the block body B3 on the pedestal 141a, and places the block body B3 so as to overlap the block body B4 on the conveyor Cv2 without changing the posture of the block body B3. Next, the transfer arm 143 grasps the block body B2 on the pedestal 141a, rotates it 180', and then places the block body B2 whose posture has been changed so as to overlap the block body B3 on the conveyor Cv2. Next, the transfer atm 143 grasps the block body B1 on the pedestal 141a, and places the block body B1 so as to overlap the block body B2 on the conveyor Cv2 without changing the posture of the block body B1. In this way, the laminate 10 is obtained by the block bodies 131 to 136 which are laminated in this order toward the lower side from the upper side in accordance with a certain laminating condition.

Subsequently, the conveyor Cv2 conveys the obtained laminate 10 to the magnet mounting device 150 based on the instructions of the controller 160. When the laminate 10 reaches the magnet mounting device 150, the controller 160 gives instructions to the magnet mounting device 150 and causes it to insert the permanent magnets 12 one-by-one into the respective magnet insertion holes 10b of the laminate 10 (fifth step, fifth process, Step S5 in FIG. 6). Subsequently, the controller 160 gives instructions to the magnet mounting device 150 and causes it to fill the resin material 14 which is in a melted state into the respective magnet insertion holes 10b to solidify the resin material 14 (fifth step, fifth process, see Step S6 in FIG. 6), In this way, each of the permanent magnets 12 is fixed in the respective magnet insertion holes 10b by the solidified resin material 14. At this time, the respective block bodies B1 to B6 are also integrated together by the solidified resin material 14 (see Step S7 in FIG. 6). In this way, the laminated rotor core 1 is obtained.

Figure 10:
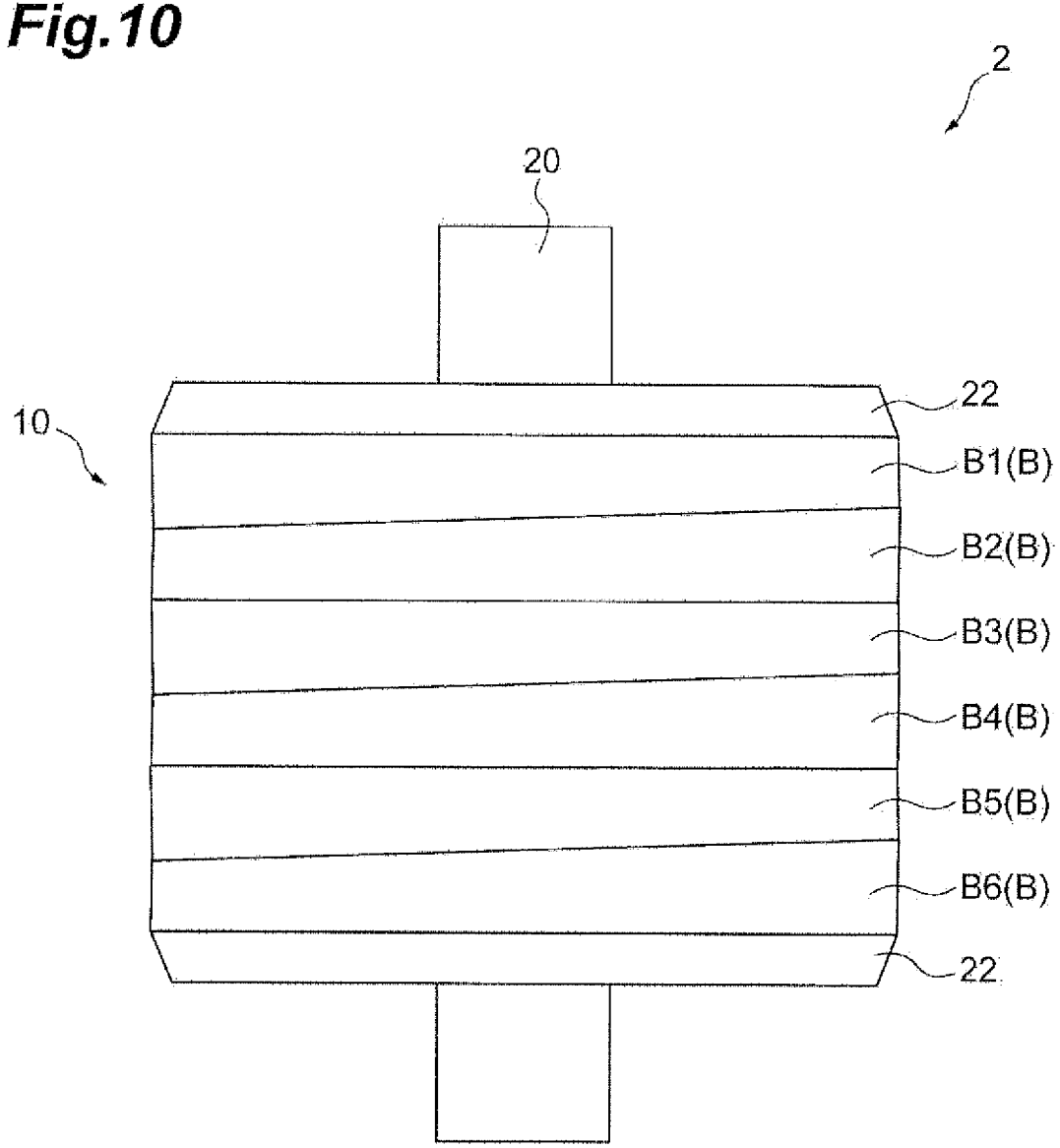
FIG. 10 is a side view illustrating one example of a rotor.

Thereafter, as illustrated in FIG. 10, the shaft 20 is secured to the laminate 10 by inserting the shaft 20 into the shaft hole 10a and press fitting keys (not depicted) between the shaft 20 and the depressions 10c. Next, end plates 22 are each disposed on both end faces in the lamination direction of the laminate 10. The end plate 22 may be secured to the end face of the laminate 10 by swaging, may be secured to the laminate 10 by screwing a nut to the shaft 20, or may be secured to the shaft 20 by a key and the like. In this way, the rotor 2 provided with the laminated rotor core 1, the shaft 20, and the end plates 22 is obtained.

Operation

Figure 11:
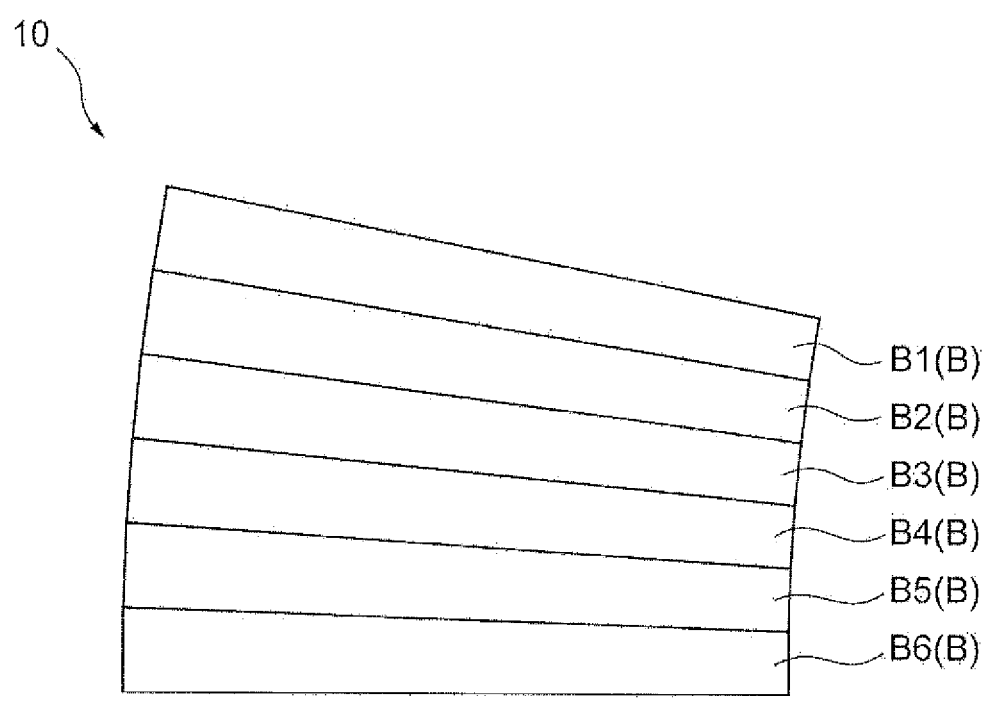
FIG. 11 is a side view illustrating a laminate in which weight imbalance is not eliminated.

In general, the thickness of the electromagnetic steel sheet W is not completely uniform but slightly fluctuates. Thus, when the block bodies B1 to B6 are composed by laminating the blanked members 30 one-by-one that have been stamped in a certain shape from the electromagnetic steel sheet W, the bias can be produced in stacking height of the block bodies B1 to B6. For example, as illustrated in FIGS. 10 and 11, the block bodies B1 to B6 are slightly in a trapezoidal shape when viewed from the lateral side. Accordingly, when the block bodies B1 to B6 are laminated not in an appropriate laminating condition, as illustrated in FIG. 11, the bias can be also produced in the stacking height of the laminate 10 in which the block bodies B1 to B6 are laminated and the weight imbalance can be produced in the laminate 10.

Incidentally, when a rotor is composed by using a laminated rotor core, in general, an end plate for securing a shaft is fitted on each end face in the lamination direction of the laminated rotor core. According to the manufacturing method disclosed in Japanese Unexamined Patent Application Publication 2012-100499, however, although the weight imbalance of the laminated rotor core is suppressed, the laminated thickness deviation is still present in the laminated rotor core. Thus, a gap is formed between the end plate and the end face of the laminated rotor core, and the fitting of the end plate to the laminated rotor core can be unstable.

However, in some examples, the laminating condition of the respective block bodies B1 to B6 is determined based on the measurement result of the weight imbalance of each of the block bodies B1 to B6. Specifically, the laminating condition is determined such that the weight imbalance of the laminate 10 becomes the smallest when the respective block bodies B1 to B6 are laminated. Thus, it is possible to obtain the laminate 10 for which the weight imbalance is suppressed by laminating each of the block bodies B1 to B6 in accordance with the laminating condition. In addition, the weight imbalance is adjusted at the time of forming the laminate 10 without depending on the other members such as the permanent magnet 12 and the resin material 14. Accordingly, the thickness in the lamination direction of the laminate 10 inevitably comes close to being uniform. As a result, as illustrated in FIG. 10, it becomes possible to obtain the laminated rotor core 1 excellent in flatness. Thus, it is possible to suppress the occurrence of a gap between the end face of the laminate 10 and the end plate 22.

In some examples, the laminate 10 is composed by laminating a plurality of block bodies B1 to B6 and, when determining the laminating condition, the stacking height of each of the block bodies B1 to B6 is measured. The measurement instrument that directly measures the weight imbalance is generally expensive, and thus, by assuming the stacking height a subject of measurement, it becomes possible to perform the measurement at low cost. Furthermore, the blanked member 30 is generally very thin, and thus an expensive measurement instrument can be needed after all and the measurement work can be cumbersome in order to measure the stacking height of the blanked member 30. However, because the block body B in which a plurality of blanked member 30 is laminated has a relatively large volume and is easy to handle, it becomes possible to measure the stacking height of the block body B simply and at low cost.

OTHER EMBODIMENTS

The foregoing embodiments in the present disclosure have been described in detail: however, various modifications may be made. For example, the angle of rotational lamination has been set to 180° in the above. However, even when the angle of rotational lamination is other than 180°, the laminating condition can be determined as with the above. For example, when the angle of the rotational lamination is set to 120°, there are three ways of the posture of the block body B. In this case, the number of combinations of the laminate 10 obtained by laminating the block bodies B1 to B6 is 729 (=3⁶). In this case also, the weight imbalance <$G_{ALL}$> on all of the combinations may be calculated, and the laminate 10 for which the magnitude |<$G_{ALL}$>| is the smallest may be determined. When it is assumed that the angle of rotational lamination is θ [° ] (where θ is a natural number that is equal to or smaller than 180 and is a divisor of 360) and that the number of block bodies B laminated is N (where N is a natural number equal to or greater than 2), the number P of combinations of the laminate 10 obtained by laminating the block bodies B of N pieces can be expressed by Expression 4.

$$P=(360/\theta)^N \qquad \text{Expression 4}$$

In the above-described embodiments, whether to rotationally laminate each block body B has been set as the laminating condition. However, whether to vertically invert each block body B may be set as the laminating condition. In this case also, when the weight imbalance of the block body B before vertical inversion is assumed +<$G_{ALL}$>, the weight imbalance of the block body B after the vertical inversion becomes −<$G_{ALL}$>. As the laminating condition, whether to rotationally laminate each block body B and whether to vertically invert each block body B may be used in combination.

When the weight imbalance still remains (when there is remaining weight imbalance) on the laminate 10 obtained based on the laminating condition that makes the weight imbalance smallest, at Step S3 in FIG. 6, the controller 160 may determine an additional condition for adjusting the relevant remaining weight imbalance (fourth step, fourth process) based on the remaining weight imbalance, wherein the additional condition includes at least one of: (A) the location of the permanent magnet 12 inserted into the magnet insertion hole 10b, (B) the weight of the permanent magnet 12 inserted into the magnet insertion hole 10b, and (C) the amount of the resin material 14 filled into the magnet insertion hole 10b, Specifically, (A) the permanent magnet 12 may be inserted into the magnet insertion hole 10b such that the permanent magnet 12 is located close to an area of large weight imbalance (area of large stacking height deviation) of the laminate 10. (B) The weight of the permanent magnet 12 that is disposed in the magnet insertion hole 10b close to an area of large weight imbalance (area of large stacking height deviation) of the laminate 10 may be lighter (including a case where the weight of the permanent magnet 12 is zero) than the weight of the permanent magnet 12 that is disposed in the magnet insertion hole 10b close to an area of small weight imbalance (area of small stacking height deviation) of the laminate 10. (C) The amount of the resin material 14 that is filled into the magnet insertion hole 10b close to an area of large weight imbalance (area of large stacking height deviation) of the laminate 10 may be less (including a case where the amount of the resin material 14 is zero) than the amount of the resin material 14 that is filled into the magnet insertion hole 10b close to an area of small weight imbalance (area of small stacking height deviation) of the laminate 10. These additional conditions A to C may be in combination. When these additional conditions A to C are determined in the controller 160, at Step S5 and Step S6 in FIG. 6, the work of inserting the permanent magnet 12 into the magnet insertion hole 10b or the work of filling the resin material 14 into the magnet insertion hole 10b is carried out based on the additional conditions A to C. In this case, the remaining weight imbalance of the laminate 10 after completion (after the lamination of a plurality of block bodies B) is further adjusted based on the additional conditions A to C. Thus, not only in forming the laminate 10 but also after the completion of the laminate 10, it is possible to minutely adjust the weight imbalance of the laminate 10. Accordingly, it becomes possible to further suppress the weight imbalance of the laminate 10.

In some of the above-described embodiments, the insertion of the permanent magnet 12 and the filling of the resin material 14 have been performed in the magnet insertion hole 10b. However, in each magnet insertion hole 10b, at least one of them may be performed, or none of them may be performed.

In some of the above-described embodiments, the weight imbalance has been calculated based on the stacking height of the block body B. However, the weight imbalance may be measured directly. Examples of the devices that directly measure the weight imbalance include a rotary imbalance measuring instrument, a static-load measurement imbalance measuring instrument, and others.

In some of the above-described embodiments, the laminate 10 has been obtained by laminating a plurality of block bodies B. However, the laminate 10 may be obtained by laminating a plurality of blanked members 30. In this case, the laminating condition of each blanked member 30 is determined by measuring the respective weight imbalance of the blanked members 30 one-by-one.

The tentative laminate 11 and the laminate 10 may be conveyed to the subsequent process by the conveying devices such as the conveyors Cv1 and Cv2 automatically, or may be carried to the subsequent process by a worker. When the worker carries the tentative laminate 11 and the laminate 10, he/she may use a dolly and the like, or may hold them by hand.

The respective end plates 22 may be attached to the laminate 10, after inserting the permanent magnets 12 into the magnet insertion holes 10b and before filling the resin material 14 into the magnet insertion holes 10b, In this case, the resin material 14 can be filled into each magnet insertion hole 10b via through holes provided on the end plate 22.

Before the stacking height measurement of each block body B by the stacking-height measurement instrument 144, a deburring process may be performed on the respective block bodies B. Specifically, the transfer arm 142 first places each block body B onto the pedestal 141a while vertically inverting the block body B, and makes the rear surface of the block body B be in a state of facing upward. In this state, the deburring device removes burrs projecting on the rear surface side in the peripheries of blanking holes of each block body B. Examples of a deburring method performed by the deburring device include shot blasting and belt sanding. Alternatively, in place of the deburring device, the burrs may be removed manually by the worker. In this case, because each block body B is laminated after vertically inverting the respective block bodies B, the order of laminating the respective block bodies B in the tentative laminate 11 and the laminate 10 can be made the same. Because the burrs on each block body B are removed, the falling of burrs from the block body B is suppressed, and thus the electric motor is not likely to be affected by the fallen burrs.

When each of the block bodies B is rotation symmetric to one another with respect to the central axis thereof, the order of laminating the respective block bodies B after the stacking height measurement by the stacking-height measurement instrument 144 is not particularly limited, and the laminate 10 may be composed by laminating the respective block bodies B in any desired order. Meanwhile, when the shape of at least one of the block bodies B is different from the others, the respective block bodies B may be laminated not in an arbitrary order but in a specific order.

The example methods and apparatus of manufacturing may be applied to not only the laminated rotor core 1 but also a laminated stator core.

Indeed, the devices and methods described herein may be embodied in a variety of other forms; furthermore, various omissions, substitutions and changes in the form of the devices and methods described herein may be made in arrangement and detail. The accompanying claims and their equivalents are intended to cover such forms or modification as would fall within the scope and spirit of the subject matter claimed herein.

What is claimed is:

1. A method of manufacturing a rotor core having a plurality of core members stacked together, the method comprising:
   determining weight imbalances for the plurality of core members with respect to a central axis of the rotor core;
   combining the weight imbalances of the plurality of core members to determine a weight distribution of the rotor core;
   displacing the weight imbalances of one or more of the plurality of core members to adjust a position of the weight distribution of the rotor core with respect to the central axis, wherein displacing the weight imbalances comprises angularly displacing the one or more core members relative to each other with a rotation angle $\theta[°]$ that is a natural number and a divisor of 360; and
   laminating the angularly displaced core members in order to form a rotor core having a smallest magnitude of the weight imbalances,
   wherein a number P of combinations of rotationally laminated N pieces of the core members is expressed by $P=(360/\theta)^N$, and wherein displacing the weight imbalances further comprises:
   evaluating P combinations of the rotationally laminated core members in order to determine a combination having the smallest magnitude of weight imbalances out of P magnitudes of the P combinations; and
   arranging the core members in the combination having the smallest magnitude of weight imbalances prior to laminating the core members.

2. The method of claim 1, wherein determining the weight imbalances comprises measuring a center of gravity of each core member with respect to the central axis of the rotor core.

3. The method of claim 1, wherein determining the weight imbalances comprises measuring each core member at a plurality of locations around the central axis for uniformity in thickness.

4. The method of claim 1, wherein the position of the weight distribution of the rotor core is adjusted by rotating one or more of the core members relative to other core members.

5. The method of claim 4, wherein a first weight imbalance is associated with a first core member and a second weight imbalance is associated with a second core member, and wherein displacing the weight imbalances comprises offsetting the first weight imbalance with the second weight imbalance when the second core member is rotated relative to the first core member.

6. The method of claim 1, wherein displacing the weight imbalances comprises rotationally laminating the core members.

7. The method of claim 6, wherein rotationally laminating the core members comprises:
   angularly displacing one or more of the core members relative to each other; and
   laminating the core members while the one or more core members are being angularly displaced.

8. The method of claim 1, wherein displacing the weight imbalances comprises vertically inverting one or more of the core members in the rotor core.

9. The method of claim 8, wherein a core member comprises an upper surface facing an upper core member and a lower surface facing a lower core member, and wherein inverting the one or more core members comprises inverting the core member so that the lower surface faces the upper core member and the upper surface faces the lower core member.

10. The method of claim 1, wherein displacing the weight imbalances comprises inserting one or more magnets into at least one core member.

11. The method of claim 10, wherein the one or more magnets are inserted into at least one through hole that penetrates through the plurality of core members, and wherein displacing the weight imbalances further comprises filling resin material into the at least one through hole.

12. The method of claim 1, wherein each of the core members includes a plurality of blanked members layered on top of each other.

13. The method of claim 12, wherein determining the weight imbalances comprises:
   exerting a load to the each of the core members including the blanked members from a lamination direction; and
   measuring a stacking height of the each of the core members.

14. The method of claim 13, wherein a magnitude of the load satisfies that a thickness T of the core member after having exerted the load is equal to or higher than 99.9% of the thickness T0 of the core member before exerting the load but the thickness T is less than the thickness T0.

15. The method of claim 1, wherein determining the weight imbalances comprises determining the weight imbalances as vector quantities for the plurality of core members with respect to the central axis of the rotor core, and wherein combining the weight imbalances comprises combining the vector quantities of the weight imbalances to determine the weight distribution of the rotor core.

16. The method of claim 1, wherein the rotation angle $\theta[°]$ is less than or equal to 180 degrees.

* * * * *